(12) United States Patent
Thomas

(10) Patent No.: US 7,216,904 B2
(45) Date of Patent: May 15, 2007

(54) IMPACT ENERGIZABLE STRUCTURE

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/212,895

(22) Filed: Aug. 26, 2005

(65) Prior Publication Data

US 2007/0046041 A1    Mar. 1, 2007

(51) Int. Cl.
*B19R 19/02* (2006.01)

(52) U.S. Cl. ....................... 293/102; 293/103

(58) Field of Classification Search ........... 293/102, 293/146, 14, 103
See application file for complete search history.

(56) References Cited

U.S. PATENT DOCUMENTS

| | | | | |
|---|---|---|---|---|
| 3,733,096 A * | 5/1973 | Kassbohrer | ............... | 293/133 |
| 3,907,353 A * | 9/1975 | Dinitz | ............... | 293/102 |
| 4,247,138 A * | 1/1981 | Child | ............... | 293/103 |
| 4,582,351 A * | 4/1986 | Edwards | ............... | 293/102 |
| 4,658,941 A * | 4/1987 | Gottwald et al. | ............... | 293/120 |
| 4,979,770 A * | 12/1990 | Shal-Bar | ............... | 293/131 |
| 4,988,258 A * | 1/1991 | Lutz et al. | ............... | 293/118 |
| 4,991,890 A * | 2/1991 | Paulson | ............... | 293/118 |
| 5,199,755 A * | 4/1993 | Gertz | ............... | 293/120 |
| 5,257,842 A * | 11/1993 | Sherno | ............... | 293/1 |
| D352,019 S * | 11/1994 | Rivero et al. | ............... | D12/169 |
| 5,360,311 A * | 11/1994 | Lutz et al. | ............... | 293/118 |
| 5,507,546 A * | 4/1996 | Holley | ............... | 293/102 |
| 5,738,378 A * | 4/1998 | Yazejian | ............... | 280/784 |
| 5,947,538 A * | 9/1999 | White | ............... | 293/135 |
| 6,089,628 A * | 7/2000 | Schuster | ............... | 293/120 |
| 6,142,542 A * | 11/2000 | Sherno | ............... | 293/102 |
| 6,199,924 B1 * | 3/2001 | Oguri et al. | ............... | 293/142 |
| 6,343,821 B2 * | 2/2002 | Breed | ............... | 293/119 |
| 6,394,512 B1 * | 5/2002 | Schuster et al. | ............... | 293/113 |
| 6,652,010 B1 * | 11/2003 | Huddle et al. | ............... | 293/102 |
| 6,764,116 B2 * | 7/2004 | Ledford et al. | ............... | 293/102 |
| 6,926,324 B1 * | 8/2005 | Gertz | ............... | 293/133 |
| 6,974,166 B2 * | 12/2005 | Ledford et al. | ............... | 293/102 |
| 7,086,674 B2 * | 8/2006 | Goertz | ............... | 293/132 |

* cited by examiner

*Primary Examiner*—Kiran B. Patel
(74) *Attorney, Agent, or Firm*—Laura C. Hargitt

(57) ABSTRACT

An impact energy management system comprises at least a portion of vehicle structure with an impact energizable structure attached thereto. The impact energizable structure receives impact energy from an obstacle and transfers the impact energy to the vehicle structure, and has a reconfigurable engagement area extending generally vertically with respect to the vehicle structure. The impact energizable structure is reconfigurable from a first position to a second position to increase the engagement area in response to an impact between the impact energizable structure and the obstacle.

10 Claims, 7 Drawing Sheets

IMPACT ENERGIZABLE STRUCTURE

TECHNICAL FIELD

This invention relates to an impact energizable structure attachable to a motor vehicle to control impact energy and, more particularly, to an impact energizable structure having an engagement area which increases as a result of impact energy.

BACKGROUND OF THE INVENTION

Vehicle crash compatibility between trucks or sport utility vehicles (SUVs) and cars has received increased attention in recent years due to an increase in truck and SUV sales. Since trucks and SUVs are designed to be driven off road, truck and SUV vehicle structure tends to be further from the ground than car vehicle structure, thereby decreasing the likelihood that the truck or SUV vehicle structure will contact the ground when going over rough or steep terrain. Due to this mismatch in vehicle structure height, the truck/SUV vehicle structure typically does not fully engage the car vehicle structure during a crash.

SUMMARY OF THE INVENTION

The present invention provides an impact energy management system comprising at least a portion of vehicle structure and an impact energizable structure attached thereto. The impact energizable structure receives impact energy from an obstacle and transfers the impact energy to the vehicle structure, and has a reconfigurable engagement area extending generally vertically with respect to the vehicle structure. The impact energizable structure is reconfigurable from a first position to a second position to increase the engagement area in response to an impact between the impact energizable structure and the obstacle. The impact energizable structure may move pivotally or substantially vertically with respect to the vehicle structure from the first position to the second position.

In one aspect of the present invention, the impact energizable structure includes a bracket reconfigurable from the first position to the second position, with the engagement area coextensive with at least a portion of the bracket. In another aspect of the present invention, the impact energizable structure includes a wedge for receiving impact energy from the obstacle, with the wedge operable to reconfigure the bracket from the first position to the second position in response to the impact. In still another aspect of the present invention, the impact energizable structure includes an intrusion sensing member for receiving impact energy from the obstacle, with the intrusion sensing member operable to reconfigure the bracket from the first position to the second position in response to the impact. In yet another aspect of the present invention, the impact energizable structure further includes a support bracket for receiving impact energy from the bracket and transferring the energy to the vehicle structure. In another aspect of the present invention, the impact energizable structure includes at least one living hinge, with the bracket bending at the living hinge(s) in response to the impact to move from the first position to the second position. A portion of the bracket may move substantially linearly as the bracket bends at the living hinge(s).

The impact energizable structure may include first and second brackets interconnected by an intrusion sensing member, with the intrusion sensing member operable to receive impact energy from an obstacle and reconfigure the first and second brackets from the first position to the second position. At least one of the first and second brackets may include a wedge, and the intrusion sensing member may attach to the wedge.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
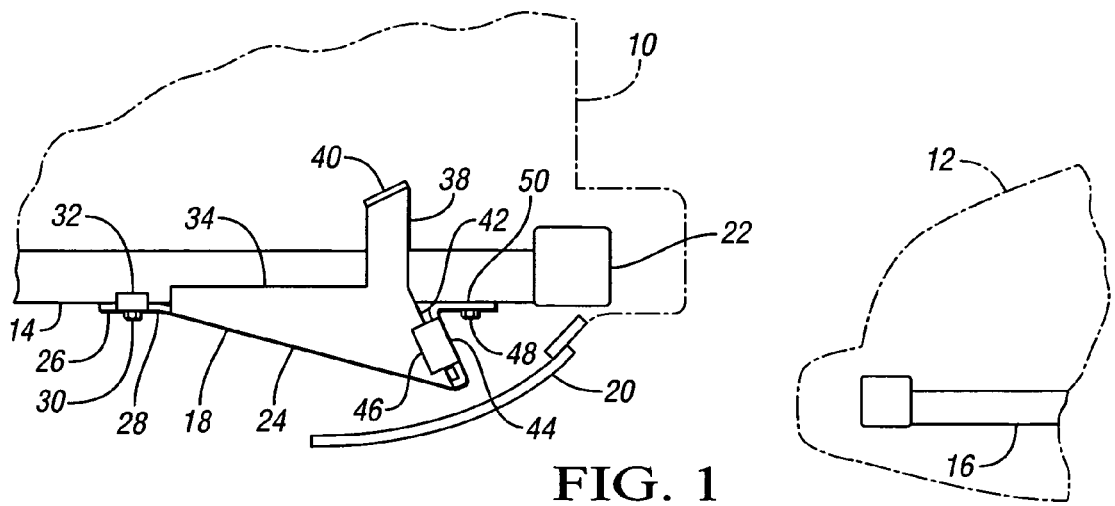
FIG. 1 is a schematic side view of first and second vehicles prior to an impact therebetween, with a bracket according to the present invention attached to a vehicle structure of the first vehicle in a first position.
Figure 3:
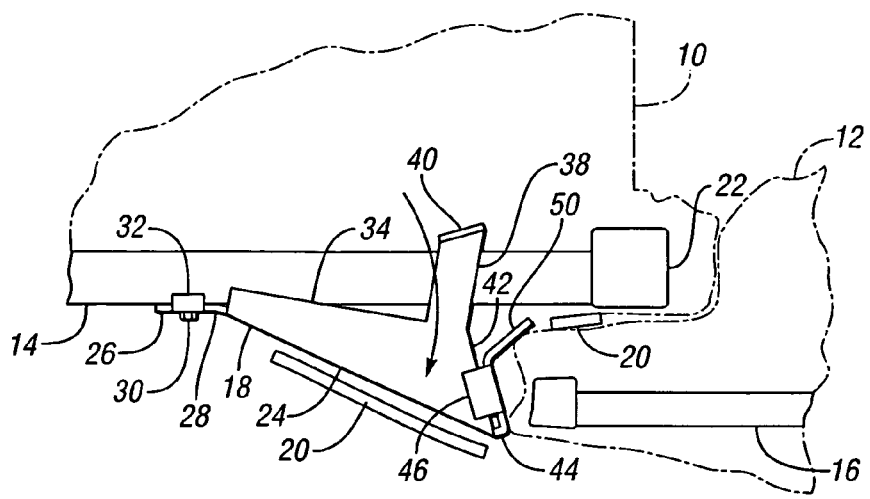
FIG. 3 is a schematic side view of the first and second vehicles of FIG. 1 following an impact, with the bracket pivoted to a second position.

Referring to the drawings, wherein like reference numbers refer to like components, FIG. 1 shows a rear of a first vehicle 10 and a front of a second vehicle 12 prior to an impact therebetween. The first vehicle 10 has a first vehicle structure 14, while the second vehicle 12 has a second vehicle structure 16. The vehicle structures 14, 16 can be any portion of the vehicle structure wherein an impact energizable structure according to the present invention may be mounted for beneficial use. The second vehicle structure 16 is disposed lower to the ground than the first vehicle structure 14. As such, in the event of a collision between the vehicles 10, 12, the second vehicle structure 16 would slide beneath the first vehicle structure 14, as shown in FIG. 3. By way of example, the first vehicle 10 may be a truck and the second vehicle 12 may be a car. A first embodiment of an impact energizable structure according to the present invention, shown as a bracket 18, is attached to the first vehicle structure 14 in a first position. As shown in FIG. 1, at least a portion of the bracket 18 extends below the first vehicle structure 14. A sacrificial plate 20 may extend from a vehicle bumper 22, from the bracket 18, or from other vehicle structure. The sacrificial plate 20 may improve vehicle aerodynamics and/or function to prevent debris from interfering with normal function of the bracket 18. The sacrificial plate 20 may comprise more than one piece of material, and is preferably easily removable, thereby allowing easy access to the bracket 18 and/or other vehicle components if service is required.

Figure 2:
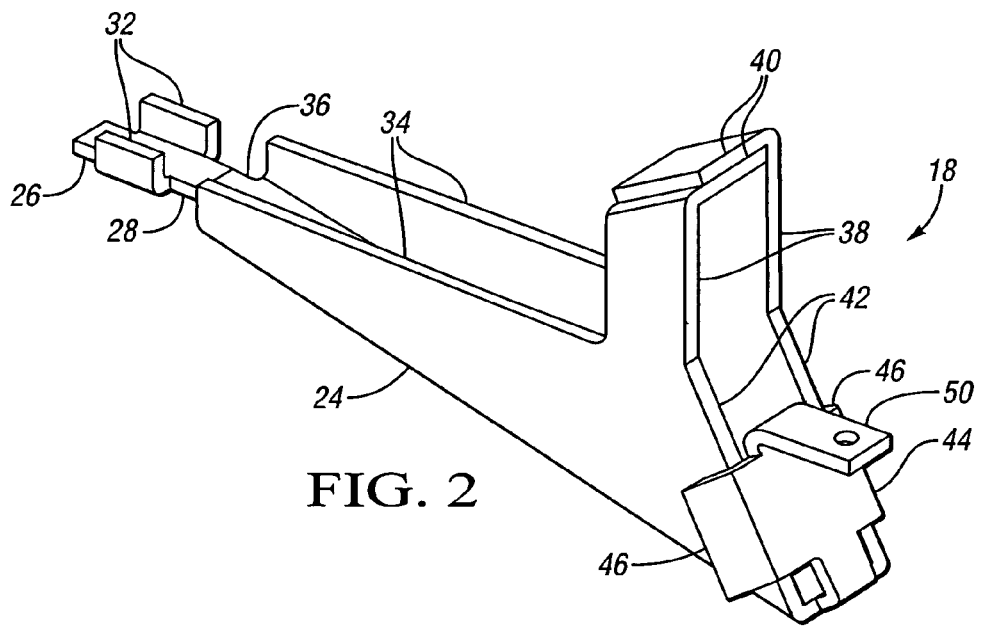
FIG. 2 is a schematic perspective view of the bracket of FIG. 1.

Turning to FIG. 2, the bracket 18 is shown in greater detail. The bracket 18 includes a contact portion 24 bendable with respect to a first attachment portion 26 at a living hinge 28. Alternatively, the contact portion 24 may pivot about a fastener, or in some other manner, with respect to the first attachment portion 26. Preferably, a fastener 30 extends through the first attachment portion 26 and the first vehicle structure 14 to attach the bracket 18 to the first vehicle structure 14. Additionally, tabs 32 extending from the first attachment portion 26 may be welded to the first vehicle structure 14. The contact portion 24 includes flanges 34 extending from a plate 36. The flanges 34 are preferably spaced apart at least the width of the first vehicle structure 14, such that the flanges 34 partially surround the first vehicle structure 14 when the bracket 18 is in the first position, as shown in FIG. 1. The flanges 34 include extensions 38, which are preferably fastened at tabs 40, such as by welding or with a fastener. The flanges 34 are preferably angled forwardly upward with respect to the first vehicle 10 between the rear of the plate 36 and the extensions 38, to define angled edges 42. The angled edges 42 thus jut forward with respect to the vehicle 10 beneath the first vehicle structure 14 when the bracket 18 is in the first position, as shown in FIG. 1. A second attachment portion 44 extends from the rear of the plate 36, with tabs 46 welded to the flanges 34. A fastener 48 (shown in FIG. 1) extends through a projection 50 to further attach the bracket 18 to the first vehicle structure 14 when the bracket 18 is in the first position. The second attachment portion 44 may be integral with the bracket 18 as shown, or it may be a separate piece fastened thereto.

Referring to FIG. 3, if, during a collision, the second vehicle structure 16 slides beneath the first vehicle structure 14, the second vehicle structure 16 will impact the bracket 18. Particularly, the second vehicle structure 16 will contact the angled edges 42 and/or the plate 36. Impact energy rotates the contact portion 24 of the bracket 18 downward with respect to the first fame member 14 (i.e. clockwise as shown in FIG. 3), with the bracket 18 bending at the living hinge 28 to reach a second position (i.e., that shown in FIG. 3). Preferably, the tabs 40 acts as travel stops for the bracket 18, such that the second position is reached when the tabs 40 contact the first vehicle structure 14. The impact energy also disengages the second attachment portion 44 from the first vehicle structure 14. For instance, the impact energy may release the fastener 48 from the second attachment portion 44, fracture fastener 48, or pull fastener 48 from the vehicle structure 14, thereby allowing the contact portion 24 of the bracket 18 to rotate downward with respect to the first vehicle structure 14. As another alternative, the second attachment portion 44 may be weakened, such that the impact energy breaks a portion of the second attachment portion 44, for example the projection 50, away from the bracket 18.

It can thus be seen that the impact energizable structure, i.e., the bracket 18, attaches to the first vehicle structure 14, and includes an engagement area offsettable with respect to the first vehicle structure 14. The engagement area for any impact energizable structure described herein includes any portion of the impact energizable structure which directly receives impact energy. Additionally, the engagement area further includes any other portion of the impact energizable structure which offsets in response to impact energy such that the offset portion is presented to receive impact energy, even if the offset portion is not directly impacted. For instance, the engagement area of the bracket 18 includes the plate 36, the extensions 38, the angled edges 42, and/or the second attachment portion 44. Particularly, prior to impact, the plate 36, the angled edges 42, and the second attachment portion 44 are presented to directly receive impact energy. Upon impact, the bracket 18 rotates from the first position to the second position. This movement or reconfiguration of the engagement area thereby increases the engagement area to increase structural overlap. Specifically, when the bracket 18 is in the second position, a greater portion of the angled edges 42 as well as the extensions 38 are presented to receive impact energy, though they may or may not be directly impacted. By increasing the structural overlap, the present invention allows increased impact energy transfer to the vehicle structure 14, thereby resulting in a reduction of vehicle intrusion during an impact event. Thus the bracket 18 comprises an impact energizable structure since the bracket 18 moves from the first position to the second position in response to impact energy to increase the engagement area. In this embodiment, the bracket 18 surrounds the vehicle structure 14. It is within the scope of the invention for the bracket 18 to extend through the vehicle structure 14 in some manner, which would likely change the distribution of impact energy from the bracket 18 to the vehicle structure 14.

It should be recognized that the bracket 18 may also attach to the second vehicle structure 16, with the engagement area extending vertically above the second vehicle structure 16, without changing the inventive concept. When the bracket 18 attaches to the second vehicle structure 16, which is lower to the ground than the first vehicle structure 14, the bracket 18 rotates or reconfigures upward from the first position to the second position to increase the engagement area. An embodiment of a bracket using this type of configuration will be described below. Additionally, as shown in the drawings, the bracket 18 is disposed at the rear of the first vehicle structure 14. However, the bracket 18 may be disposed at the front of the first vehicle structure 14, or at any another position along a vehicle frame without changing the inventive concept. It matters only that impact energy causes the bracket 18 to move or reconfigure from a first position to a second position to increase the engagement area thereof.

Figure 4:
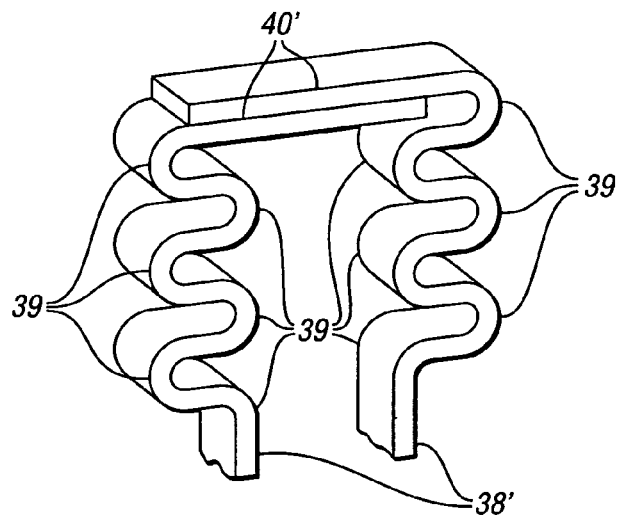
FIG. 4 is a schematic perspective view of an alternative design for a portion of the bracket of FIG. 3.
Figure 5:
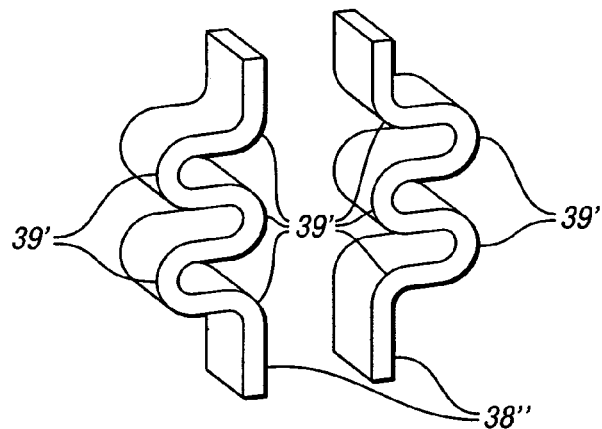
FIG. 5 is a schematic perspective view of an alternative design for a portion of the bracket of FIG. 3.

FIGS. 4 and 5 depict alternative embodiments for the extensions 38 of the first embodiment of the bracket 18. FIG. 4 shows extensions 38' having a plurality of bends 39, such that the height of a bracket employing extensions 38' would be reduced, while the width of a bracket employing extensions 38' would increase. This may be advantageous for certain vehicle types. The extensions 38' are preferably welded together at tabs 40', which act as a travel stop for the bracket 18 as described with respect to the first embodiment of the extensions 38 above. FIG. 5 also shows extensions 38" having a plurality of bends 39'. However, instead of including tabs, the extensions 38" are mechanically fastened directly to the first vehicle structure 14.

Figure 6:
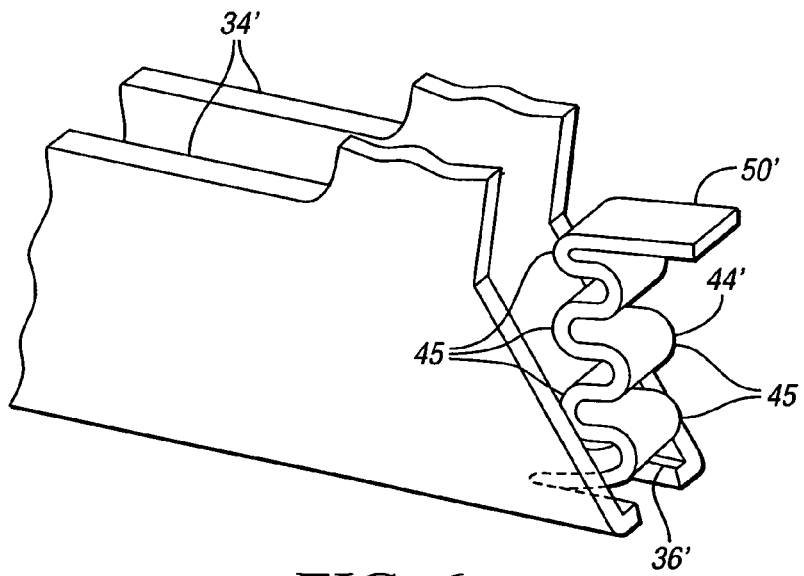
FIG. 6 is a schematic perspective view of an alternative design for a portion of the bracket of FIG. 3.

FIG. 6 shows an alternative embodiment of a second attachment portion 44' of the bracket 18 of FIG. 2. The second attachment portion 44' extends from a plate 36' between a pair of flanges 34', and includes a series of bends 45 ending in a projection 50'. The projection 50' preferably attaches to the first vehicle structure 14 of FIG. 1. As the bracket 18 moves from the first position to the second position, the bends 45 straighten out, thereby allowing the contact portion 24 of the bracket 18 to bend at the living hinge 28, as described with respect to FIGS. 1 through 3 (i.e., about any other type of pivot).

Figure 7:
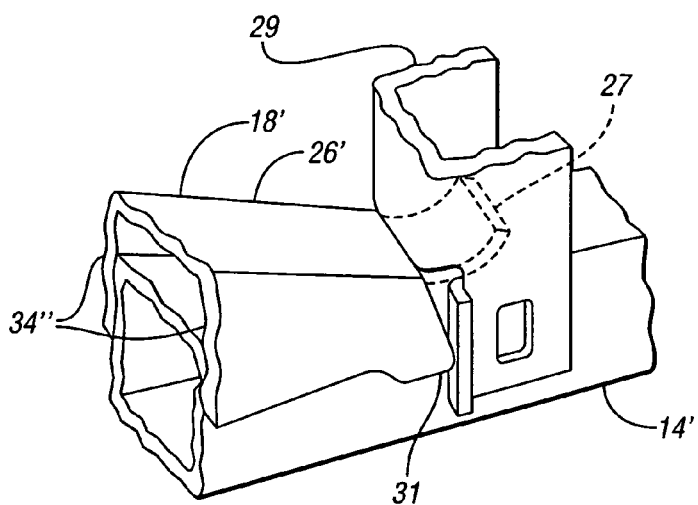
FIG. 7 is a schematic perspective view of an alternative design for a portion of the bracket of FIG. 3.

FIG. 7 shows an alternative embodiment of a first attachment portion 26' of a bracket 18'. The first attachment portion 26' includes a tab 27 disposed between a first vehicle structure 14' and a support bracket 29 attached to the first vehicle structure 14' for supporting the bracket 18'. The support bracket 29 may comprise any portion of existing vehicle structure, such that the tab 27 routes directly into a slot in the existing vehicle structure, or it may be a separate piece. The tab 27 may be curved, as shown in FIG. 7, and/or may bend during movement of the bracket 18' from the first position to the second position. Flanges 34" on a bracket 18' include pointed fingers 31 which contact flanges on the support bracket 29. When impact energy pushes the bracket 18' toward the support bracket 29, the pointed fingers 31 react against the support bracket 29 to help the bracket 18' move from a first position to a second position (as described above).

Figure 8:
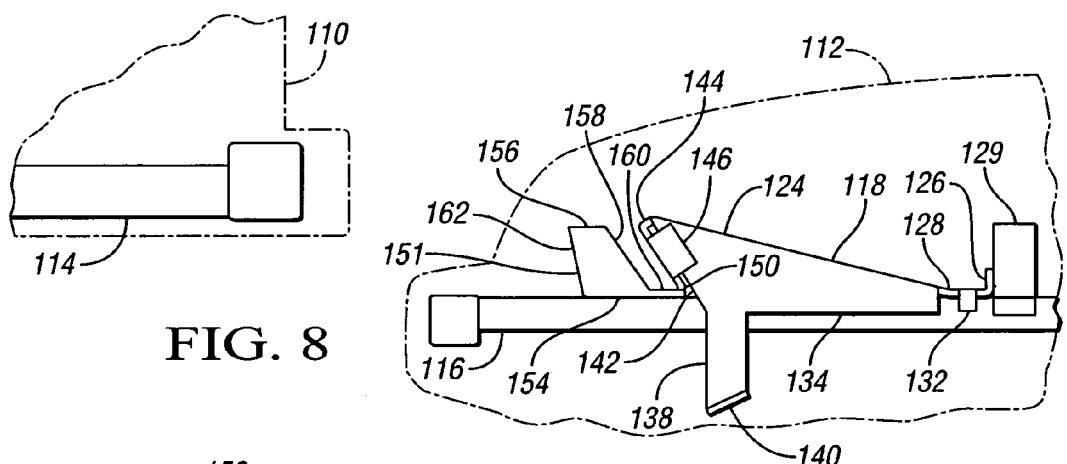
FIG. 8 is a schematic side view of first and second vehicles prior to an impact therebetween, with a second embodiment of a bracket according to the present invention attached to a vehicle structure of the second vehicle in a first position.
Figure 9:
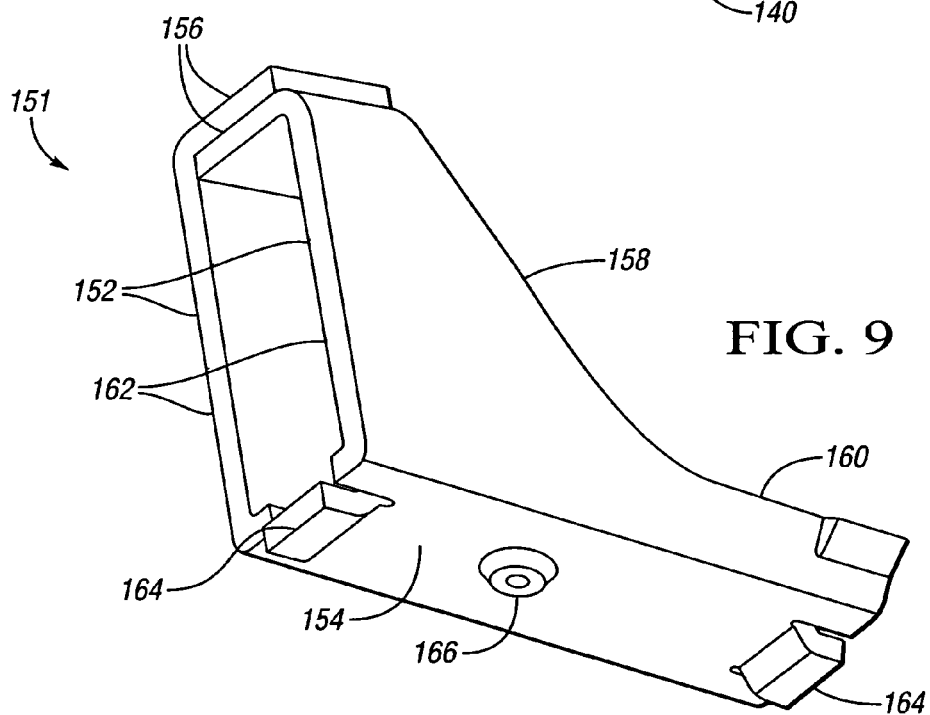
FIG. 9 is a schematic perspective view of a wedge operable to reconfigure the bracket of FIG. 8 from the first position to the second position.
Figure 10:
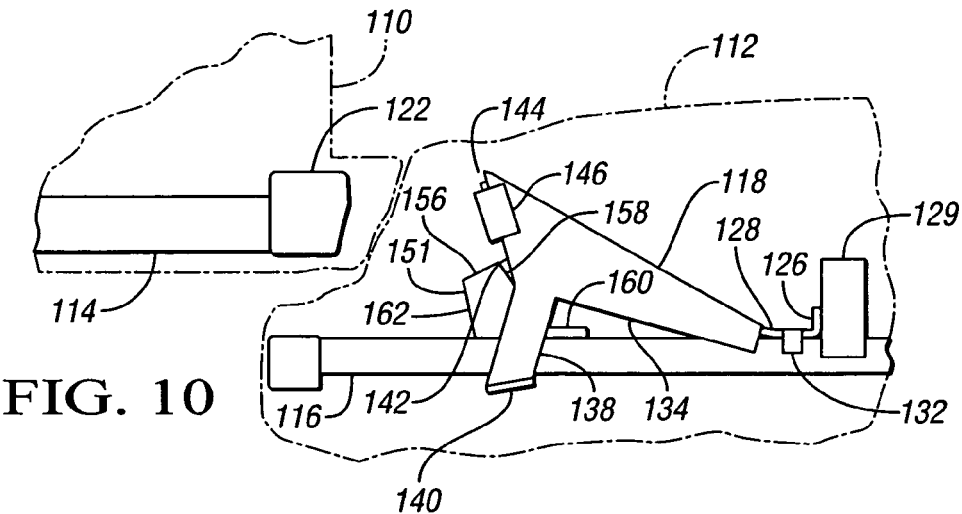
FIG. 10 is a schematic side view of the first and second vehicles of FIG. 8 following an impact, with the bracket pivoted to a second position.

Turning now to FIGS. 8 through 10, a second embodiment of an impact energizable structure according to the present invention is shown. FIG. 8 shows a rear of a first vehicle 110 and a front of a second vehicle 112 prior to an impact therebetween. The first vehicle 110 has a first vehicle structure 114, while the second vehicle 112 has a second vehicle structure 116, with the second vehicle structure 116 disposed lower to the ground than the first vehicle structure 114. The second embodiment of the impact energizable structure includes a bracket 118 and a wedge 151. The bracket 118 is shown attached to the second vehicle structure 116 in a first position, and is substantially identical to the bracket 18 described with respect to the first embodiment of the present invention, although being attached to the second vehicle structure 116 necessitates a different orientation. Since FIGS. 8 and 10 show a side view of the impact energizable structure, only one of each pair of components of the bracket 118 is shown. However, it should be recognized by one skilled in the art that since the bracket 118 is substantially identical to the bracket 18, components not shown in FIGS. 8 and 10 can be identified with reference to the bracket 18.

A least a portion of the bracket 118 extends above the second vehicle structure 116. The bracket 118 includes a contact portion 124 bendable with respect to a first attachment portion 126 at a living hinge 128. Tabs 132 extending from the first attachment portion 126 may be welded to the second vehicle structure 116. Alternatively, as shown, a support bracket 129 may be fixed to the second vehicle structure 116, with the first attachment portion 126 affixed thereto. The contact portion 124 includes flanges 134 spaced apart at least the width of the second vehicle structure 116, such that the flanges 134 partially surround the second vehicle structure 116 when the bracket 118 is in the first position, as shown in FIG. 8. The flanges 134 include extensions 138, which are preferably welded together at tabs 140. The flanges 134 are preferably angled forward with respect to the second vehicle 112 to define angled edges 142. A second attachment portion 144 includes tabs 146 welded to the flanges 134. A projection 150 extends from the bracket 118, with a frangible fastener extending through the second vehicle structure 116 and/or the wedge 151 when the bracket 118 is in the first position.

The impact energizable structure further includes the wedge 151, which is disposed between the contact portion 124 of the bracket 118 and the front (with respect to the second vehicle 112) of the second vehicle structure 116. FIG. 9 shows the wedge 151 in further detail. The wedge 151 preferably includes flanges 152 extending from a plate 154, with the flanges 152 preferably welded together at tabs 156. However, the flanges 152 may be connected by other means, or they may not be connected. The flanges 152 are angled rearward with respect to the second vehicle 112 to define angled edges 158 which terminate at extensions 160, and angled impact edges 162. The wedge 151 preferably further includes tabs 164 and a separator 166 to offset the wedge 151 from the second vehicle structure 116, thereby preventing the wedge 151 from fusing with the second vehicle structure 116 due to corrosion from normal vehicle use.

Referring to FIG. 10, if, during a collision, the second vehicle structure 116 slides beneath the first vehicle structure 114, a vehicle bumper 122 attached to the first vehicle structure 114 will contact the angled impact edges 162 on the wedge 151. The wedge 151 has a width less than the distance between the flanges 134 of the bracket 118. Therefore, the impact energy will drive the extensions 160 toward the bracket 118 between the flanges 134, while also breaking the frangible fastener keeping the wedge 151 and/or the bracket 118 in the first position. As the wedge 151 moves toward the bracket 118, the angled edges 158 push the bracket 118, thereby rotating the contact portion 124 of the bracket 118 upward (i.e., clockwise as shown in FIG. 10), with the bracket 118 bending at the living hinge 128 to reach a second position (i.e., that shown in FIG. 10). Preferably, the tabs 140 acts as travel stops for the bracket 18, such that the second position is reached when the tabs 140 contact the second vehicle structure 116. In this embodiment, the engagement area includes at least a portion of the wedge 151 (i.e., angled edges 162), and at least a portion of the bracket 118 (i.e., at least a portion of angled edges 142 and/or at least a portion of the second attachment portion 144).

Figure 11:
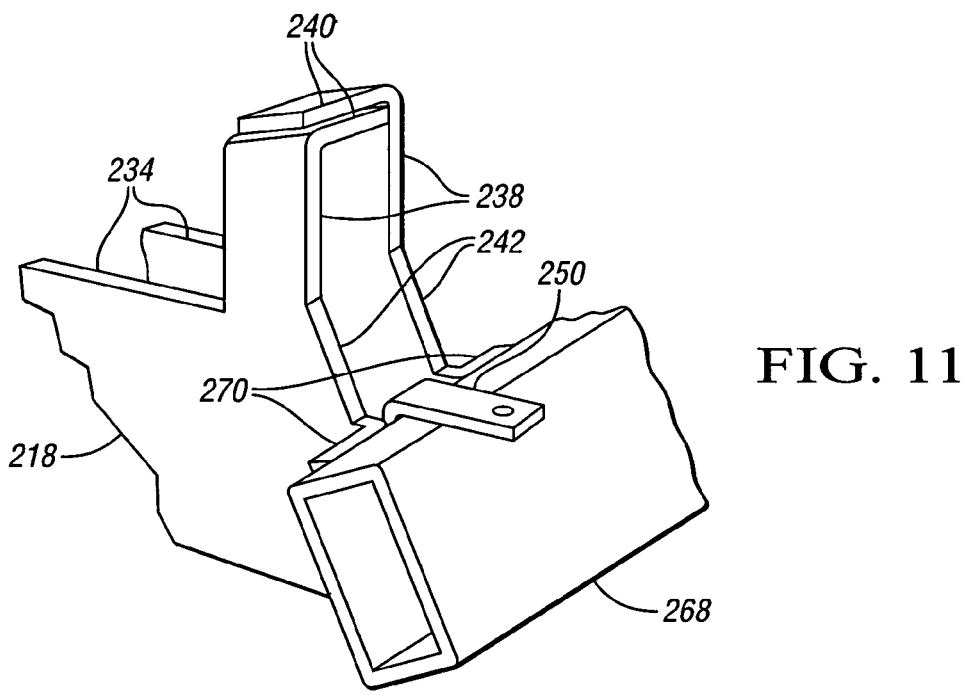
FIG. 11 is a schematic perspective view of the bracket of FIG. 3 including an intrusion sensing member.
Figure 12:
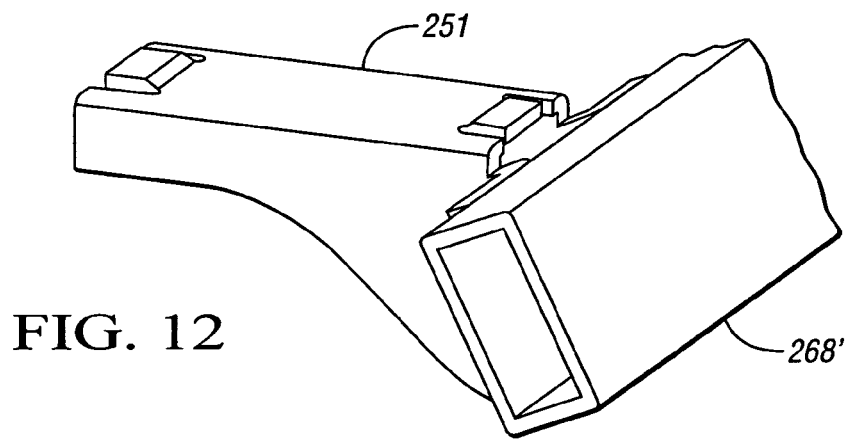
FIG. 12 is a schematic perspective view of the wedge of FIG. 9 including an intrusion sensing member.

Turning now to FIG. 11, a portion of a bracket 218 of an impact energizable structure is shown, with a first embodiment of an intrusion sensing member 268 in the form of a crossbar attached thereto. The bracket 218 includes flanges 234 which are preferably spaced apart at least the width of a vehicle structure (not shown) to which the bracket 218 is attached. The flanges 234 include extensions 238, preferably welded together at tabs 240 and angled edges 242. Tabs 270 extend outward from the flanges 234, with the intrusion sensing member 268 attached to the tabs 270. A projection 250 attaches the bracket 218 to the vehicle structure when the bracket 218 is in a first position. The intrusion sensing member 268 extends laterally and attaches to a second impact energizable structure (not shown) disposed on a second vehicle structure (not shown). The intrusion sensing member 268 will receive impact energy in the event of an impact, and transfer the impact energy to rotate the bracket 218 from a first position to a second position (as described with respect to previous embodiments), thereby moving the intrusion sensing member 268 therewith. Since the second impact energizable structure is also attached to the intrusion sensing member 268, a second bracket will also move from a first position to a second position. As shown in FIG. 12, a wedge 251 of an impact energizable structure may also have an intrusion sensing member 268' attached thereto. It can thus be seen that the intrusion sensing member 268, 268' may interconnect two brackets, a bracket and a wedge, or two wedges, as well as any other two structures comprising an impact energizable structure according to the present invention.

Figure 13:
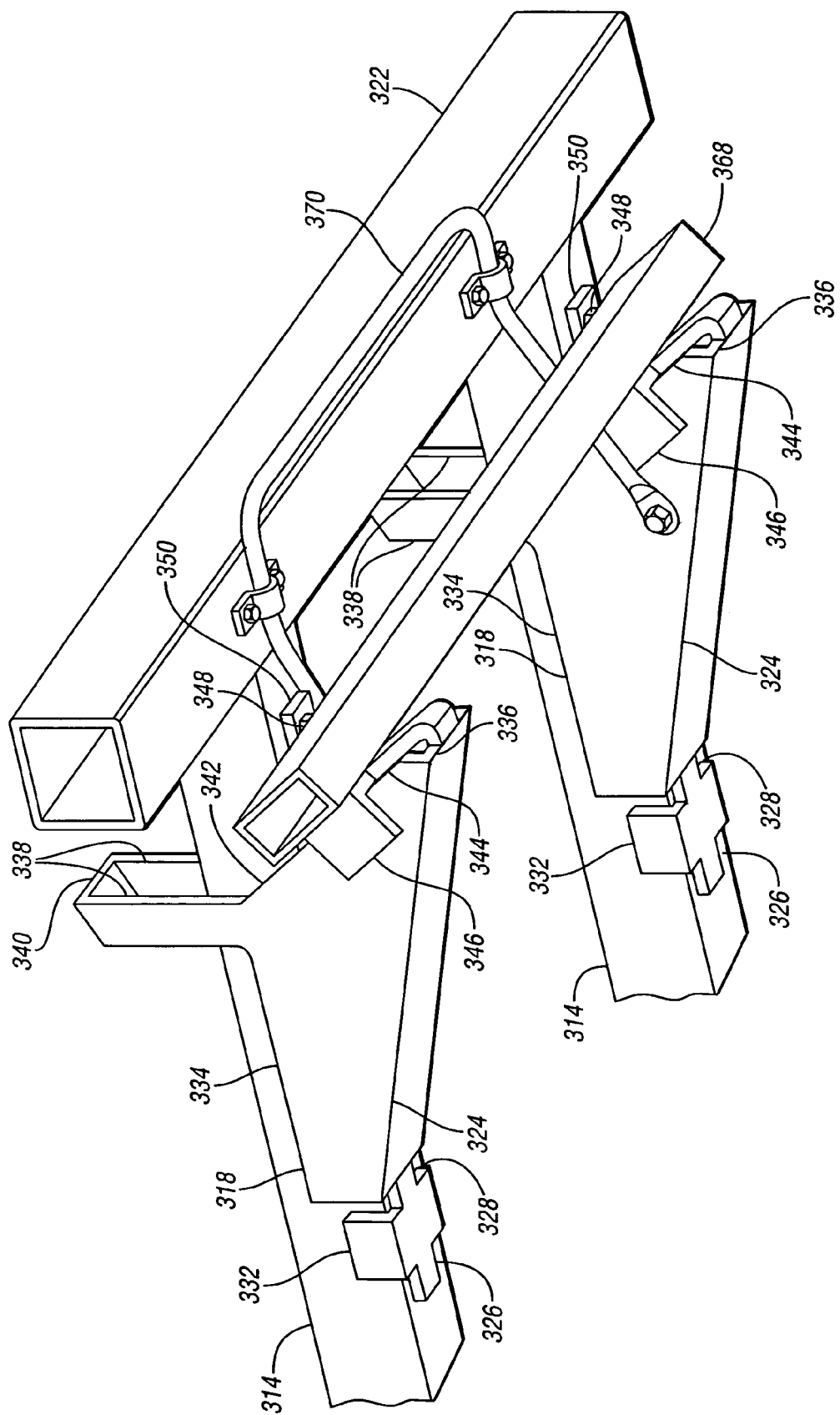
FIG. 13 is a schematic perspective view of two brackets according to the present invention interconnected by first and second embodiments of an intrusion sensing member.

FIG. 13 shows yet another embodiment of an impact energizable structure according to the present invention, wherein the impact energizable structure includes a pair of brackets 318 attached to a pair of vehicle structures 314, with the brackets 318 being interconnected by a first embodiment of an intrusion sensing member 368, i.e., a crossbar, and/or a second embodiment of an intrusion sensing member 370. The vehicle structures 314 extend substantially perpendicularly from a vehicle bumper 322. The brackets 318 are shown substantially identical; however, any bracket wherein impact energy moves the bracket from a first position to a second position may be utilized. As shown, the brackets 318 include contact portions 324 bendable with respect to first attachment portions 326 at living hinges 328. Tabs 332 extending from the first attachment portions 326 may be welded to the vehicle structures 314. The contact portions 324 include flanges 334 extending from plate 336. The flanges 334 are preferably spaced apart at least the width of the vehicle structures 314, such that the flanges 334 at least partially surround the vehicle structures 314 when the brackets 318 are in a first position, as shown in FIG. 13. The flanges 334 include extensions 338, which are preferably welded together at tabs 340, and are angled toward the bumper 322 to define angled edges such as 342. Second attachment portions 344 extend from the plates 336, with tabs 346 welded to the flanges 334. Fasteners 348 extend through projections 350 to further attach the brackets 318 to the vehicle structures 314 when the brackets 318 are in the first position.

The intrusion sensing member 368 attaches to each of the brackets 318, preferably at the second attachment portions 344, such that movement of one of the brackets 318 effects movement of the other of the brackets 318. The intrusion sensing member 370 is substantially U-shaped. As shown, the intrusion sensing member 370 attaches to the inner flanges 334 of each of the brackets 318, and extends rearward. At least a portion of the intrusion sensing member 370 may extend beyond the bumper 322. The intrusion sensing member 370 may extend through an orifice (not shown) within the bracket(s) 318, such that the intrusion sensing member 370 disengages from the bracket(s) 318 as the bracket(s) 318 rotate(s) from the first position to the second position. Thus, if the bracket(s) 318 is loaded directly, the bracket(s) 318 will detach from the intrusion sensing member 370 during movement from the first position to the second position. The intrusion sensing member 370 may also attach to a wedge (such as shown in FIG. 9) as described with respect to previous embodiments. That is, the intrusion sensing member 370 may interconnect two brackets 318, a bracket 318 and a wedge, or two wedges, as well as any other two structures comprising an impact energizable structure according to the present invention.

During an impact event, if an obstacle impacts the intrusion sensing member 370, the intrusion sensing member 370 pushes on each of the brackets 318 (or whichever portion of the impact energizable structure to which the intrusion sensing member 370 is attached), to induce rotational motion therein, thereby moving the brackets 318 from the first position to a second position (such as shown in FIG. 3). In the second position, the brackets 318 have a larger engagement area; that is, the brackets 318 present more surface area to receive impact energy, as discussed in relation to previous embodiments of the present invention. As another alternative, the intrusion sensing member 370 may attach to an inside of the bumper 322, such that impact energy received by the bumper 322 passes to the intrusion sensing member 370, which will then rotate the brackets 318 to the second position. The intrusion sensing member 370 may be configured to disengage from the bracket 318 or the wedge if the bracket 318 or the wedge directly receive impact energy. Also note that the intrusion sensing member 368 or the brackets 318 themselves may receive impact energy, with the brackets 318 rotating from the first position to the second position as a result, as described with respect to previous embodiments. It can thus be seen that the first embodiment of the intrusion sensing member 368 preferably senses intrusion significantly below the vehicle bumper 322, while the second embodiment of the intrusion sensing member 370 preferably senses intrusion at or near the bumper 322.

Figure 14A:
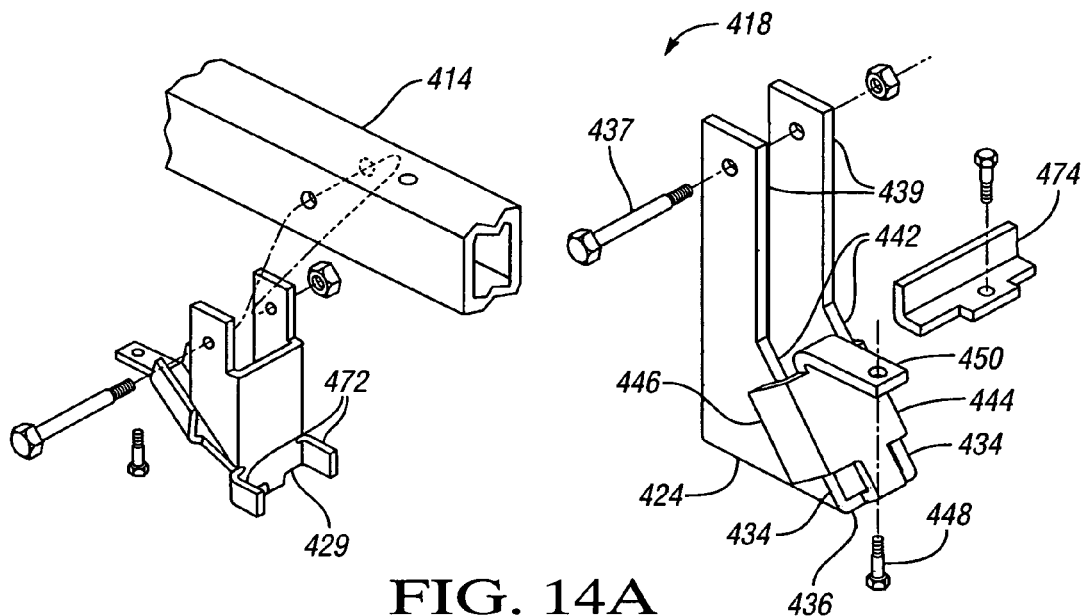
FIG. 14A is an exploded schematic perspective view of a third embodiment of a bracket according the present invention in a first position.
Figure 14B:
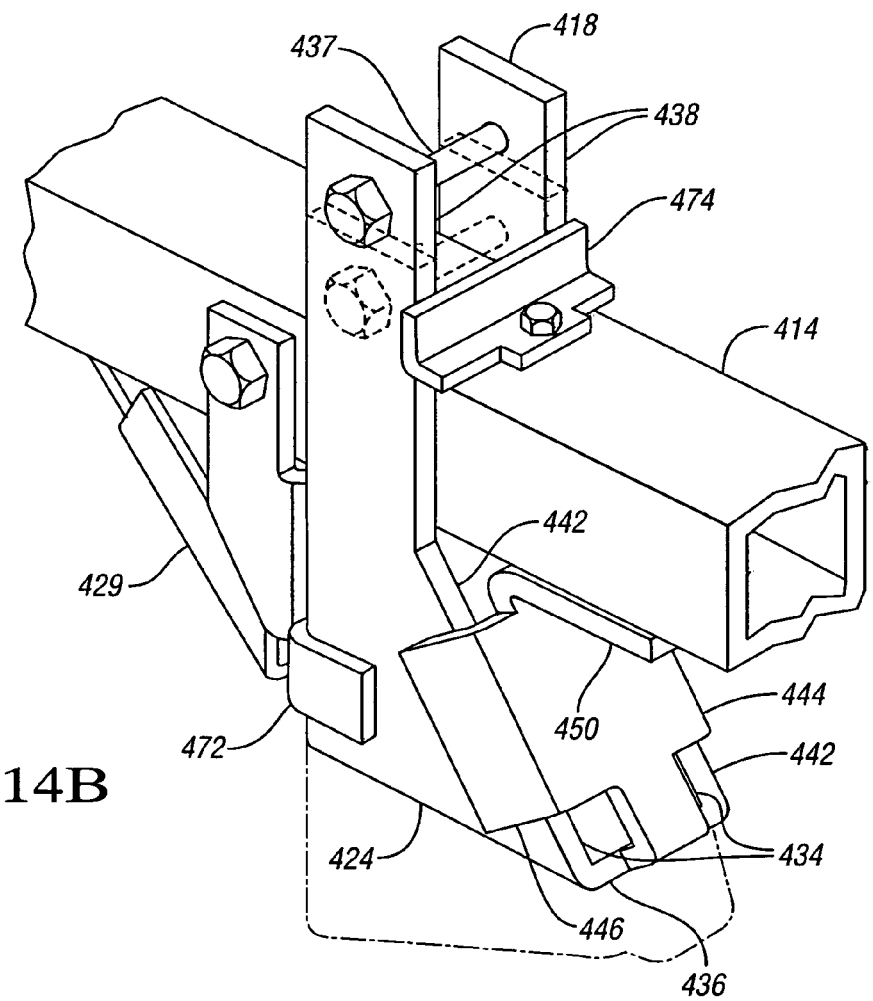
FIG. 14B is a schematic perspective view of the bracket of FIG. 14A, with the bracket moved substantially vertically to a second position.

FIGS. 14A and 14B present still another embodiment of an impact energizable structure according to the present invention. Particularly, FIG. 14A shows an exploded view of a bracket 418 which translates from a first position, shown in FIG. 14B, to a second position, shown in phantom in FIG. 14B, in response to an impact. The bracket 418 includes a contact portion 424 translatable with respect to a support bracket 429 attached to the vehicle structure 414, preferably to an underside thereof. The support bracket 429 may be a portion of existing vehicle structure, or it may be a separate piece. The support bracket 429 preferably includes tabs 472 which surround the contact portion 424, as shown in FIG. 14B, which provide support to the contact portion 424 during movement from the first position to the second position.

The contact portion 424 includes flanges 434 extending from a plate 436. The flanges 434 are preferably spaced apart at least the width of a vehicle structure 414, such that the flanges 434 at least partially surround the vehicle structure 414 when the bracket 418 is in a first position, as shown in FIG. 14B. The flanges 434 include extensions 438, which are interconnected by a fastener 437. Alternatively, the flanges 434 may be welded together at tabs, as described with respect to previous embodiments. The flanges 434 are preferably angled between the plate 436 and the extension 438 to define angled edges 442. A second attachment portion 444 extends from the plate 436, with tabs 446 at least partially surrounding the flanges 434. A fastener 448 (FIG. 14A) extends through a projection 450 to attach the bracket 418 to the vehicle structure 414 when the bracket 418 is in the first position. A reaction bracket 474 attaches to the vehicle structure 414 adjacent the extensions 438, preferably on an opposite side of the contact portion 424 as the support bracket 429. The reaction bracket 474 may be a portion of existing vehicle structure, or it may be a separate piece.

During an impact event, if an obstacle contacts the bracket 418, the fastener 448 through the projection 450 of the second attachment portion 444 releases, thereby allowing the bracket 418 to translate from the first position to a second position, shown in phantom in FIG. 14B. Thus, when in the first position, the bracket 418 provides a first engagement area, particularly the second attachment portion 444 and at least a portion of the angled edges 442. The bracket 418 is energized by impact energy to translate to the second position. In the second position, the engagement area increases; i.e., more of the bracket 418 is disposed below the vehicle structure 414 to receive impact energy. The support bracket 429 and the reaction bracket 474 react against the contact portion 424 during movement from the first position to the second position.

Figure 15:
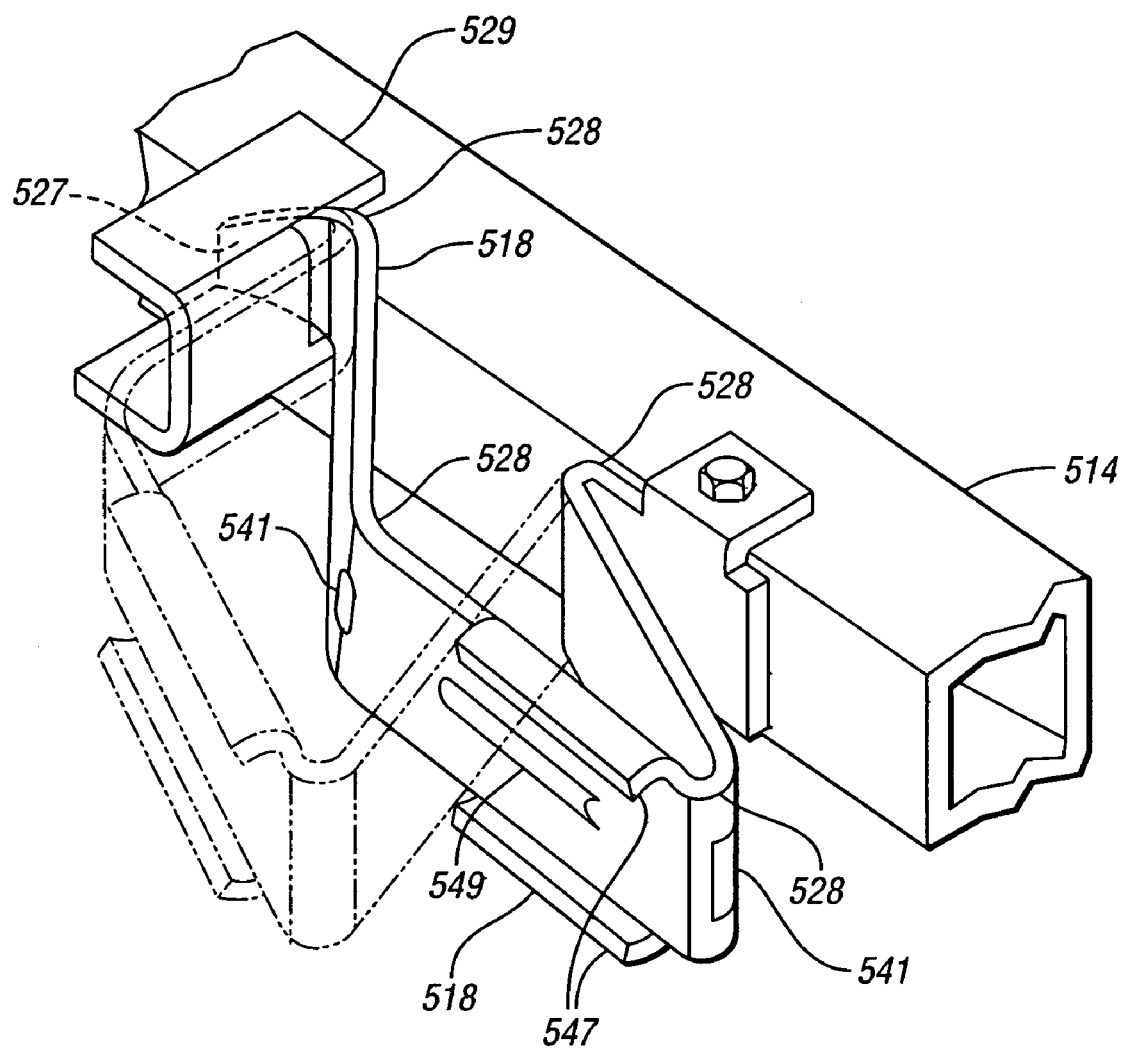
FIG. 15 is a schematic perspective view of a fourth embodiment of a bracket according to the present invention.

FIG. 15 shows another embodiment of an impact energizable structure according to the present invention. Specifically, FIG. 15 shows a bracket 518 attached to a vehicle structure 514. The bracket 518 reconfigures from a first position or configuration, shown in solid lines in FIG. 15, to a second position or reconfiguration, shown in phantom in FIG. 15, in response to an impact. The bracket 518 preferably uses a one-piece construction. However, this embodiment could employ a plurality of interconnected links pivotal with respect to one another. The bracket 518 includes a tab 527 disposed between the vehicle structure 514 and a support bracket 529 attached to the vehicle structure 514 when the bracket 518 is in the first position. Additionally, the bracket 518 attaches directly to the vehicle structure 514 at least at an opposite end of the bracket 518 from the tab 527, as shown in FIG. 15. The bracket 518 may attach to the vehicle structure 514 multiple times without changing the inventive concept. The bracket 518 includes a plurality of living hinges 528, and may include weakening features 541 such as holes, notches or grooves, and/or strengthening features such as flanges 547 and darts 549 to increase or decrease bracket rigidity as necessary for proper functioning. During an impact event, if an obstacle contacts the bracket 518, the bracket 518 bends at each living hinge 528, thereby moving from the first position to the second position to increase an engagement area for receiving impact energy. The bracket 518 may also be configured such that the tab 527 translates toward the support bracket 529 as the bracket 518 moves from the first position to the second position. Additionally, either the bracket 518 or the support bracket 529 may transfer impact energy to the vehicle structure 514.

While the best mode for carrying out the invention has been described in detail, it is to be understood that the terminology used is intended to be in the nature of words of description rather than of limitation. For instance, while the present invention has been partially described in the context of two vehicles impacting one another, it should be obvious to one skilled in the art utilizing the teachings of the present invention that impact energy from any obstacle can reconfigure an impact energizable structure, specifically by moving the impact energizable structure from a first position to a second position, to increase an engagement area. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An impact energy management system comprising:
a vehicle structure; and
an impact energizable structure attached to said vehicle structure for receiving impact energy and transferring said impact energy to said vehicle structure, said impact energizable structure having a reconfigurable engagement area offsettable with respect to said vehicle structure;
wherein said impact energizable structure is reconfigurable from a first position to a second position to increase said engagement area in response to an impact received by said impact energizable structure;
wherein said impact energizable structure comprises a bracket moveable from said first position to said second position, and wherein said engagement area is coextensive with at least a portion of said bracket;
wherein said bracket includes at least one living hinge, and wherein said bracket bends at said at least one living hinge in response to said impact to move from said first position to said second position.

2. The impact energy management system of claim 1, wherein said impact energizable structure further comprises a wedge for receiving said impact energy, said wedge being operable to move said bracket from said first position to said second position in response to said impact.

3. The impact energy management system of claim 1, wherein said impact energizable structure further comprises an intrusion sensing member for receiving said impact energy, said intrusion sensing member operable to move said bracket from said first position to said second position in response to said impact.

4. The impact energy management system of claim 1, wherein said impact energizable structure further comprises a support bracket for receiving impact energy from said bracket and transferring said energy to said vehicle structure.

5. The impact energy management system of claim 1, wherein at least a portion of said bracket moves substantially linearly as said bracket moves from said first position to said second position.

6. The impact energy management system of claim 1, wherein said impact energizable structure comprises first and second brackets interconnected by an intrusion sensing member, said intrusion sensing member operable to receive impact energy from an obstacle, and move said first and second brackets from said first position to said second position in response thereto.

7. The impact energy management system of claim 6, wherein at least one of said first and second brackets includes a wedge for receiving impact energy from said obstacle, said wedge being operable to move said bracket from said first position to said second position in response to said impact.

8. The impact energy management system of claim 7, wherein said intrusion sensing member attaches to said wedge.

9. The impact energy management system of claim 1, wherein said impact energizable structure reconfigures pivotally with respect to said vehicle structure from said first position to said second position.

10. The impact energy management system of claim 1, wherein said impact energizable structure reconfigures substantially vertically with respect to said vehicle structure from said first position to said second position.

* * * * *